United States Patent
Cherlin et al.

(10) Patent No.: US 12,517,271 B2
(45) Date of Patent: Jan. 6, 2026

(54) RADIATION DETECTION SYSTEM AND METHOD

(71) Applicants: KROMEK LIMITED, Sedgefield (GB); UCL Business Limited, London (GB)

(72) Inventors: Alex Cherlin, Sedgefield (GB); Ian Baistow, Sedgefield (GB); Andras Wirth, Sedgefield (GB); Brian Forbes Hutton, London (GB); Kjell Ake Gustav Erlandsson, London (GB); Kris Filip Johan Jules Thielemans, London (GB)

(73) Assignees: KROMEK LIMITED, Sedgefield (GB); UCL Business Limited, London (GB)

( * ) Notice: Subject to any disclaimer, the term of this patent is extended or adjusted under 35 U.S.C. 154(b) by 166 days.

(21) Appl. No.: 18/250,804

(22) PCT Filed: Oct. 29, 2021

(86) PCT No.: PCT/GB2021/052801
§ 371 (c)(1),
(2) Date: Apr. 27, 2023

(87) PCT Pub. No.: WO2022/090722
PCT Pub. Date: May 5, 2022

(65) Prior Publication Data
US 2023/0384467 A1    Nov. 30, 2023

(30) Foreign Application Priority Data

Oct. 30, 2020   (GB) ...................................... 2017233
Jan. 22, 2021   (GB) ...................................... 2100878

(51) Int. Cl.
*G01T 1/24*    (2006.01)
*G01T 1/164*   (2006.01)

(52) U.S. Cl.
CPC ............ *G01T 1/242* (2013.01); *G01T 1/1647* (2013.01); *G01T 1/249* (2013.01)

(58) Field of Classification Search
CPC ........ G01T 1/242; G01T 1/1647; G01T 1/249
See application file for complete search history.

(56) References Cited

U.S. PATENT DOCUMENTS 10,502,844 B2    12/2019   Hugg et al.
2012/0061581 A1   3/2012   Hugg et al.

FOREIGN PATENT DOCUMENTS

EP          3876244 A1 *   9/2021   ............... A61B 6/00
WO       WO2021176232 A1   9/2021

OTHER PUBLICATIONS

ISA/EP, European Patent Office, International Search Report and Written Opinion, Feb. 2, 2022, 8 pages, European Patent Office.

* cited by examiner

*Primary Examiner* — David P Porta
*Assistant Examiner* — Fani Polyzos Boosalis
(74) *Attorney, Agent, or Firm* — FERENCE & ASSOCIATES LLC

(57) ABSTRACT

A method of processing radiation from a source is described comprising: positioning a detector to receive radiation from the source; positioning a collimator between the source and the detector, wherein the collimator has a plurality of apertures; allowing radiation from the source to pass through the collimator and be incident upon the detector; receiving a plurality of responses each being a response to an interaction with incident radiation occurring within the detector; determining, for each of the plurality of responses, a characteristic of the interaction, wherein the characteristic comprises at least a position and depth of the interaction within the detector; processing the said plurality of responses by simultaneously processing position and depth of interaction data in such manner as to accommodate the effect of multiplexing due to overlap of the projected radiation pathways from multiple apertures in the collimator at the detector on the detected position on the detector. A radiation detection system for the detection of radiation from a source, in particular to perform the method, is also described.

20 Claims, 8 Drawing Sheets

RADIATION DETECTION SYSTEM AND METHOD

The present application is a National Phase Entry of PCT International Application No. PCT/GB2021/052801, which was filed on Oct. 29, 2021, and which claims priority to Application No. 2017233.4 filed in Great Britain on Oct. 30, 2020 and Application No. 2100878.4 filed in Great Britain on Jan. 22, 2021, the contents of which are hereby incorporated by reference.

The invention relates to a radiation detection system for the detection of radiation from a source, for example a radioisotope source, and in particular relates to a system adapted for the detection of radiation from a source where the source creates a low signal at the detector. The invention additionally relates to a method for the detection of radiation from such a source.

INTRODUCTION

A wide range of scenarios exists where it might be desirable to obtain more accurate information about radiation which is being emitted from a source and received at a detection system. In particular, a wide range of scenarios exists in which it might be desirable to resolve the information, for example spatially and/or spectroscopically, to provide additional information about the source and/or about materials through which the radiation has passed through between source and detector.

Such scenarios include, but are not limited to, scenarios where a source and detector are deliberately spaced apart, and radiation emitted from high activity areas in the test object is measured at the detector to determine information in respect of the test object.

Examples of such latter scenarios include nuclear medicine imaging methods, where radiation from a radioisotope source is caused to pass to a part of the body of a subject under investigation, and where spatially registered information about the radiation received at a remote detector is used to obtain information regarding the structure and/or the real time physiological function of that part of the patient's anatomy, and for example to build up an image of that structure and/or physiological function. However, discussion of such applications is by way of example only, and the invention is not limited to medical or imaging applications.

The principles of the invention find particular application where the signal from the source is relatively low, and the signal of resolvable data from the relatively smaller number of particles of radiation emitted from the source incident upon a detector is consequently reduced, making it more difficult to separate meaningful information from background. Such considerations are likely to apply in particular in medical applications, where there is a clear imperative to minimise the radiation dose experienced by the subject under test. Again therefore, nuclear medicine imaging provides a good example of a technology in which the principles of the invention might be advantageously applicable.

However, the advantages of the invention in relation to the resolution of higher level information from low-level signals apply generally to all cases where a low signal from the source needs to be resolved. An example of a non-medical application where a low signal is expected might be in the inspection of nuclear facilities using portable gamma cameras.

The advantages of the invention may accrue in both analogous and different ways in situations where reconstruction of images might be required and where reconstruction of images is unnecessary or undesirable.

An example of an established nuclear medicine imaging technique is single-photon emission computed tomography (SPECT) which is a nuclear medicine tomographic imaging technique using gamma rays. The technique requires the delivery into the patient, for example via the bloodstream, of a gamma-emitting radioisotope. In a typical application, the radioisotope is bound to a specific ligand, allowing it to be carried to and bound within a place of interest in the body of the subject under investigation.

The radioisotope emits gamma rays which passes through the tissue of the subject under investigation and can be detected at a suitable detector, and for example by a gamma camera. SPECT imaging by the gamma camera acquires multiple two-dimensional images which are then built up into a three-dimensional dataset using a standard tomographic reconstruction technique. The technique potentially allows not merely imaging of the relevant part of the body but active functional imaging of biological processes.

A known technique for imaging of breast tissue, for example to detect abnormalities that might lead to the early detection of breast cancer, is mammography. Standard mammography uses X-rays to create images. These images are then analyzed for abnormal findings and in particular for characteristic dense masses that might indicate potential tumours for example. These patients are then referred for further, usually more invasive, testing. Standard mammography is thus a widely adopted first stage screening technique.

However, the response of normal but relatively dense breast tissue to the low-energy x-rays can be similar to that of the sort of masses that might be indicative of potential development of many commonplace tumours, and the ability of the technique to distinguish in those patients which have a high proportion of high-density breast tissue is consequently reduced.

Molecular breast imaging (MBI) is a developed nuclear medicine imaging technique that utilises many of the above principles of SPECT-type techniques. A radioisotope source, again typically bound to a suitable ligand to cause it locate within breast tissue, is introduced into the subject under investigation. A suitable system of small semiconductor-based gamma cameras in a configuration generally corresponding to that for a more conventional mammogram is used to detect radiation from the source after it has passed through the breast tissue. The technique can be particularly effective at detecting incipient tumours, as it can detect physiological activity. It does generally subject the patient under investigation to higher overall radiation dose however, which has tended to limit its application as a first stage screening technique.

In all nuclear medicine imaging techniques, there is a clear imperative to keep the radioactivity of the source, and the consequent dose of radiation received by the subject under investigation subject under investigation, as low as possible. The resultant low signal to be collected at the detector presents particular problems in relation to both detection and resolution of data.

A factor that affects the required source signal is the efficiency of detection. In particular in relation to imaging techniques, to get the required spatial resolution a detection system is required that distinguishes between a plurality of separately addressable detection points or regions. For example in the case of planar detectors, spatial resolution may be in the x and y directions. In current practice, two-dimensional (2D) detectors will often be used, but detection can also be done in three dimensions (3D).

In an imaging system, each point in a detector may correspond to a pixel or voxel in a reconstructed image, and may generally be referred to as a pixel on the detector. To achieve effective spatial and for example x, y resolution in the resultant image a detection system is required that distinguishes between the "pixels" in the x and y directions in a manner that allows an effective signal to be obtained for each of the separately addressable "pixels" in the x and y directions individually.

Radiation detectors of any type, and in particular the solid-state detectors which are widely used in conventional medical imaging applications, are usually characterised by the feature that their efficiency is dependent upon thickness. It need be not a trivial relationship, but in most cases the thicker the detector, the greater the efficiency. Conventionally, the efficiency of the solid-state detectors which are widely used in conventional medical imaging applications is enhanced by provision of a suitable depth in a z-direction or orthogonal to the x, y of the detection surface.

However, in order to maintain positional registration in x, y it is often necessary to collimate the signal emitted from the source incident upon the detector. The quality and usefulness of any image in a nuclear medicine imaging technique is seriously affected by the collimator structure.

It is normal to use a collimator such as a parallel-hole collimator with a very low spread angle between a source and a gamma camera or other detector which creates a registration in the signal between the source and detector that approaches a nearly one to one registration in the x, y plane. The collimator consists of a large number of closely packed parallel holes that would only let that part of the radiation through, which is nearly perpendicular to the collimator surface. As a result, the detector will acquire a single orthogonal projection of the radiation source. This image can be directly used in case of 2D gamma cameras, but for 3D SPECT applications, the acquisition must be repeated from multiple angular positions around the patient to obtain enough information for the reconstruction algorithm.

The effective development of instrumentation for nuclear medicine imaging embodying techniques such as SPECT or MBI is therefore a compromise between the requirement for effective collimation with substantially complete one to one registration in an x, y direction, for example using parallel hole collimators with a very low spread angle, the consequent reduction in signal by the collimator, and the requirement for the lowest radiation dose source possible.

In the field of MBI in particular there is a wealth of literature on the use of single and dual planar detectors with moderate breast compression. State of the art commercial systems for example utilise CZT detectors with high-resolution parallel-hole collimators. Due to the proximity to the breast good spatial resolution is achieved. Detection sensitivity is superior to conventional mammography in patients with dense breasts, but radiation dose is higher. Efforts to reduce radiation dose have included choice pf collimator and image filtering to reduce noise/enhance contrast but these do not achieve sufficient reduction in dose to enable MBI use as a screening tool.

There is a general desire to provide for alternative detection systems and methods which allow for the better resolution of information concerning radiation in such scenarios, and for example from a low-intensity source; from short-duration measurements etc.

There is a particular desire to provide such alternatives which might have applicability in nuclear medicine imaging, and which might address those conflicting considerations in a more effective and efficient way and provide for improved resolution of physiologically relevant data from a patient and/or reduced radiation dose levels in respect of nuclear medicine imaging techniques such as SPECT or MBI.

The use of multi-apertured collimators that do not have a low spread angle, for example consisting of pinholes or slits without substantial depth in a z direction, has been explored.

For example multi-pinhole collimators have been used extensively in preclinical systems where magnification results in high resolution performance. The concept of using high intrinsic resolution in combination with densely packed pinholes with minification as a means of achieving high sensitivity is not new and has an added advantage of enabling compact designs. The development of metal additive 3D-printing has enabled greater flexibility of design. A range of alternative collimators have been evaluated for MBI including the variable angle slant hole (VASH) and slit-slat.

A limitation in the design of multi-apertured collimators that do not have a low spread angle and for example multi-slit or multi-pinhole collimators is the projection overlap (multiplexing) that can occur, which can result in image artefacts. The conventional approach is to avoid multiplexing, for example by separating pinholes, introducing internal shielding to limit the exposed detector or using a shutter system to expose different pinholes sequentially, but this can limit the design options. Use of two different opposing collimators has also been suggested as a means of overcoming multiplexing. Use of multiple acquisition distances (synthetic collimation) has been shown to reduce multiplexing artefacts in preclinical imaging. An approach to iterative de-multiplexing within a modified MLEM reconstruction has also been suggested. In all cases, the objective is that of substantial reduction to effective elimination of the projection overlap (multiplexing) that can occur with multi-apertured collimators, or at least the reduction of multiplexing artefacts that might thereby be produced.

The present invention is directed to this multiplexing problem, and to the provision of alternative solutions that mitigate some of the effects of such multiplexing and/or make better use of data where such multiplexing may be present. The present invention is particularly directed to achieving these objectives in the context of apparatus and methods which might have applicability in nuclear medicine imaging, for example for techniques such as SPECT or MBI, and which might address the conflicting considerations of reducing dose levels and maintaining sufficient signal after collimation losses to provide for improved resolution of physiologically relevant data from a patient and/or reduced radiation dose levels.

SUMMARY OF INVENTION

In accordance with the invention in a first aspect, a method of processing radiation from a source comprises:
 positioning at least one detector to receive radiation from the source;
 positioning a collimator between the source and the detector, wherein the collimator has a plurality of apertures;
 allowing radiation from the source to pass through the collimator and be incident upon the detector;

receiving a plurality of responses each being a response to an interaction with incident radiation occurring within the detector;

determining, for each of the plurality of responses, a characteristic of the interaction, wherein the characteristic comprises at least a position and depth of the interaction within the detector;

processing the said plurality of responses by simultaneously processing position and depth of interaction data in such manner as to accommodate the effect of multiplexing due to overlap of the projected radiation pathways from multiple apertures in the collimator at the detector on the detected position on the detector.

It will be understood that where reference herein is made to a detector this applies to any detector formation effective to receive radiation from the source with a resolution such as to enable the required determining, for each of the plurality of responses of a characteristic of the interaction, wherein the characteristic comprises at least a position and depth of the interaction within the detector. In particular, the singular includes the plural. The invention may be applied to a detection system comprising multiple discrete detector formations and/or to a single detector formation defining multiple discrete detection areas and/or to a single detector formation defining a single continuous detection area which is virtually subdivided into separately addressed sub-areas. The plurality of responses may be received from multiple detectors.

In some applications of the invention, the at least one detector is positioned generally perpendicular to a direction of radiation incidence to define an x, y plane of incidence perpendicular to a direction of radiation incidence and a z-direction corresponding to a depth of the detector, and it will be understood that a position of the interaction within the detector may constitute a position in x for a linear detector and in x, y for an area detector and a depth of the interaction within the detector may constitute a depth in z.

In some applications of the invention, the detector may be pixelated, which is to say the detector may be divided into a one- or two-dimensional array of discretely addressable sub-units being discrete elements and/or discretely addressable regions, for example defined on a surface generally perpendicular to a direction of radiation incidence, and it will be understood that a position of the interaction within the detector may constitute a localisation to a particular discretely addressable sub-unit and a depth of the interaction within the detector may constitute a depth below the surface of the said sub-unit. Sub-units may be discrete physical entities or may be defined virtually in digital manner, in the sense that detection area, which may be physically continuous is virtually sub-divided, a position is determined in x, y, and this determined position is used to assign the interaction to a sub-unit.

Where reference herein is made to such sub-units as pixels, this term will be understood unless the context expressly demands otherwise to include physically discrete pixel sub-units, clusters of the same, and sub-units defined virtually in digital manner as above.

The invention is distinctly characterised over the prior art discussed above by the use of a collimator that has an array of multiple apertures inherently configured to produce overlap between the patterns of radiation from different apertures in such manner as to tend to create a multiplexing effect at the detector, the use of a detector with a non-trivial depth to capture this complexity by determining both a position and depth of the interaction within the detector, and the use of this detected complexity at the processing stage to accommodate and for example to mitigate the contribution of such multiplexing and preferably also to make further use of the multiplexing to draw additional useful inferences.

That is to say, it is inherent in the invention that the collimator has an introduced three-dimensional complexity to the radiation from the source in which there is not necessarily a direct registration between each aperture and a given area on the detector but instead there may be overlap in the respective areas which may lead to potential for multiplexing.

This is a consequence of the structure of the apertures being such that each of the apertures defines a radiation projection zone beyond the aperture that exhibits a non-zero angular spread. For example in the case of a multihole collimator each hole aperture is configured such that it defines a radiation projection cone beyond the aperture with a positive angular spread. Each aperture is thus in effect an imaging aperture, as would be understood in the imaging art, in that at least some complexity from which image information could be resolved is inherently contained in the radiation projection from a single aperture. The collimator is further configured such that the resultant radiation projection zones beyond the apertures may overlap and produce a multiplexing effect at the detector.

It is further a feature of embodiments of the invention that the detector localises each interaction not only in a detector x, y plane but also in a detector depth of interaction or z direction. This dataset including depth of interaction as well as position in x, y is then used to reconstruct a picture of the pattern of radiation from the source in a manner that may accommodate and for example mitigate multiplexing effects. That is to say, the method of the invention is characterised by using a collimator with multiple apertures with overlapping projected radiation zones, accepting the resultant multiplexing effects in the raw data of interaction position in x, y, but using depth of interaction in z to accommodate and for example to mitigate the contribution of such multiplexing and preferably also to make further use of the multiplexing to draw additional useful inferences.

In some embodiments, the method comprises processing a collected dataset comprising the determined position and depth of each interaction within the detector and producing therefrom a modified dataset comprising at least data for a modified position of each interaction, and for example of data localising each interaction in a pixel and/or in an x, y direction as hereinabove defined, in such manner as to accommodate the effect of multiplexing due to overlap of the projected radiation pathways from multiple apertures in the collimator at the detector on the apparent position to which the interaction was localised in the input dataset.

In some embodiments, the method comprises reducing the effect of multiplexing and for example substantially eliminating the effect of multiplexing from the modified dataset.

In preferred embodiments, where the data may be used to reconstruct one or more images, the invention may further comprise using depth of interaction to accommodate multiplexing effects in the reconstructed image(s) for example to improve image quality and reducing artefacts in the reconstructed image(s).

By contrast, in the typical prior art, the approach conventionally employed is to mitigate and ideally substantially eliminate overlap at the acquisition stage by appropriate configuration of hardware, and for example appropriate configuration of collimation and pixelation such as to maintain a monotonic registration for detected interactions localised pixel by pixel. In the typical prior art approach, multiplexing, that is to say variation of x, y position with z, is seen not as a feature that can be accommodated in the raw detected interaction dataset, and even made use of, but as a problem to be minimized or eliminated from the raw detected interaction dataset by minimizing or eliminating overlap altogether at the acquisition stage.

In that prior art, conventional collimation systems are intended to maintain a substantially monotonic 1 to 1 positional registration in x, y in the radiation pattern as it passes from source to detector.

A drawback of this is that a significant number of photons do not reach the detector. In a typical MBI system perhaps as few as 1 in $10^4$ photons are registered. Similar levels are typical for other SPECT-type techniques.

The consequence is that a much higher signal source of radiation, and in the case of medical imaging a consequent higher radiation dose into the patient's tissue, is required to get a satisfactory number of photon interactions at the detector to generate an image. The alternative, to relax the angle passed by the collimator, for example by using larger dimensioned holes, will lose resolution in the image.

The present invention by contrast is distinctly characterised not by the elimination of multiplexing in the hardware at the acquisition stage, but by the collection of inherently multiplexed interaction data which includes depth of interaction data, and by the provision of a processing step to reconstruct this more complex data and draw additional or alternative inferences as regards the radiation from the source to accommodate and for example mitigate the multiplexing effects and optionally also to make further use of the multiplexing to draw additional useful inferences.

As a result, the present invention takes a radically different approach to the apparent conflict that exists in the prior art between maintaining adequate signal/reducing dose and losing image contrast. It relies on the realisation that if the depth of each photon interaction, that is, the position in a z-direction within a deep detector, can also be resolved to some degree, a dataset may be produced in which each photon interaction can be localised positionally to some degree in all of the x, y and z co-ordinates, which may allow inferences to be drawn, and the dataset to be deconvolved by suitable reconstruction methods in a suitable processing and reconstruction module, which may obviate the need to collimate and pixelate with an objective of near one to one x, y registration, and which may as a result significantly reduce the number of photons which are prevented from passing the filter and thus significantly increase the proportion of photons which pass the filter to be usefully collected at the detection module and meaningfully processed. An effective set of data may be collected from a much lower inherent source level of radioactivity, and for example in the case of medical imaging a consequent lower radiation dose into the patient's tissue.

In accordance with the invention, the method comprises using a collimator with plural apertures that do not have a minimized spread angle. In a particular preferred case, the collimator is not a parallel hole collimator, although even parallel hole collimators and other collimators designed for a minimized spread angle may not eliminate multiplexing in all situations and the principles of the method of the invention may be used accordingly.

In embodiments, the collimator may have a one-dimensional array or a two-dimensional array of plural apertures that do not have a minimized spread angle. Apertures may be configured for example in that each aperture defines a portion from which radiation emerges that is configured, for example with reference to a short length and/or a divergent profile in an emergent radiation direction, to tend to cause radiation passing through the aperture to have a non-zero spread angle as it emerges. A suitable spread angle might be at least 15 degrees.

In some embodiments, the method comprises using a collimator with an array of slits and for example a slit-slat arrangement. In other embodiments, the method comprises using a collimator with a one-or two-dimensional array of pinholes. In such cases the slits or pinholes may be of equivalent or different configuration, and may be evenly spaced or differently spaced. Other arrangements and configurations of a plurality of apertures may be envisaged.

In accordance with the invention, the method comprises receiving a plurality of responses to a corresponding plurality of interactions with incident radiation occurring within the detector, and for each such response determining at least a position of interaction and a depth of interaction within the detector of the said interaction.

For example, the method of the invention comprises the use of a detector adapted or configured to enable an interaction with incident radiation occurring within the detector to be localised to an interaction position within the detector in three dimensions. The method in such a case includes a step of causing radiation from the source to be incident upon such a detector and performing the receiving and determining steps accordingly.

In some embodiments for example, the invention comprises the use of a detector comprising a three-dimensional voxel array, wherein the determining for each of the plurality of responses, a characteristic of the interaction including at least a position in three dimensions of the interaction comprises localising the said interaction to a particular voxel.

In some embodiments, the detector comprises a means to localise an interaction within the detector to each of an x and a y direction in a plane generally perpendicular to a direction of incident radiation, and a z direction comprising a depth within the detector in a direction generally orthogonal to the x, y plane.

For example, the radiation detector comprises a detection surface divided into a plurality of separately addressable detection portions defined positionally across the detection surface in each of two orthogonal directions, hereinafter an x-direction and a y-direction, whereby an interaction at the detection module of a particle of a radiation incident from the source may be localised positionally to a detection portion; and a depth in a third orthogonal direction, hereinafter a z-direction, the radiation detector being configured such that an interaction at the detection module of a particle of a radiation incident from the source may be further localised positionally to a depth in the z direction.

The method further comprises receiving and processing, for example at a suitable processing module in data communication with the radiation detector, radiation data from a successive plurality of particle interactions at the detector, each thereby localised positionally to a particular voxel and/or to x, y and z co-ordinates.

In accordance with the invention the method comprises drawing inferences regarding the pattern of radiation from the source. In particular, inferences may be drawn by simultaneously processing position and depth of interaction data in such manner as to accommodate the effect of multiplexing due to overlap of the projected radiation pathways from multiple apertures in the collimator at the detector on the apparent position on the detector and for example on the pixel in which the interaction occurs.

In some embodiments, the method is applied as a method for collecting radiation data after transmission through a test object, for example for imaging of the test object, and the system is adapted to be used as a system for collecting radiation data after transmission through a test object.

In such a case the method additionally comprises:
positioning a test object between the source and the collimator
causing radiation from the source to be incident upon the test object, and causing at least some of the radiation emergent therefrom to pass the filter and be incident upon the detection module.

Each of a successive plurality of particle interactions collected at the detection module after transmission through the test object is localised positionally for example in x, y and z co-ordinates.

In accordance with the invention in general principle the method comprises receiving a plurality of responses to a corresponding plurality of interactions with incident radiation occurring within the detector, and for each such response determining at least a position of interaction and a depth of interaction within the detector of the said interaction.

In some embodiments the method comprises:
determining an input dataset comprising the determined position and depth of each interaction within the detector, and
processing the input dataset and producing therefrom a modified dataset comprising at least data comprising a position of each interaction modified in such manner as to accommodate the effect of multiplexing due to overlap of the projected radiation pathways from the multiple apertures.

In some embodiments, the method comprises generating an image dataset. In possible embodiments, the input dataset for the successive plurality of particle interactions is processed to generate an image dataset. The method may further comprise generating an image and optionally further displaying the image.

In such embodiments, the method comprises simultaneously processing position and depth of interaction data in such manner as to accommodate the effect of multiplexing due to overlap of the projected radiation pathways from multiple apertures in the collimator at the detector on the apparent position and for example on the pixel in which the interaction occurs to reducing multiplexing artefacts in the resultant imaging dataset or image. In such embodiments, the reconstructed dataset hereinbefore referenced may comprise the image dataset.

In some embodiments, the method is applied as a method of medical examination and for example medical imaging, and the test object is a part of the body of a test subject, and for example a human or non-human animal subject.

In some embodiments, the method comprises generating an image dataset and for example an image by tomographic reconstruction. In such a case the reconstructed dataset hereinbefore referenced may comprise the tomographic image dataset or a part thereof for example representing an image layer thereof.

In such embodiments, the method comprises simultaneously processing position and depth of interaction data in such manner as to accommodate the effect of multiplexing on the reconstructed tomographic image dataset for example to reduce multiplexing artefacts in the reconstructed tomographic image.

The method may further comprise displaying the tomographic image.

In general principle, tomographic reconstruction comprises imaging built up from radiation data from a source collected at a detector by converting raw data, in the form of a dataset of radiation interaction responses attributable to radiation from the source incident on the detector, into a 3D image dataset. Reconstruction of data from limited number and orientation of projection angles is often referred to as tomosynthesis.

At its broadest concept when applied to tomographic reconstruction, the invention comprises accommodating potential multiplexing effects in raw data by processing the collected dataset of radiation interaction responses in accordance with both a determined position and a depth of each interaction within the detector and using the latter to accommodate multiplexing effects in the former and thereby for example to mitigate multiplexing effects in a resultant image dataset.

A suitable tomographic reconstruction methodology, for example based on a known tomographic reconstruction methodology, may be used in conjunction with modifications according to the principles of the invention. In some embodiments, a method of maximum-likelihood expectation-maximisation (ML-EM) image reconstruction may be used. In some embodiments, the method may be combined with an ordered subset algorithm (OS-EM). In other embodiments, penalised image reconstruction may be used, such as the One Step Late method, or more advanced optimisation methods.

In some embodiments, the input dataset comprising the determined position and depth of each interaction within the detector is processed and account is taken of both a determined position and a depth of each interaction to accommodate multiplexing effects and produce a modified dataset before subsequent tomographic reconstruction. In some embodiments, the input dataset comprising the determined position and depth of each interaction within the detector is processed and account is taken of both a determined position and a depth of each interaction to accommodate multiplexing effects and produced a modified dataset simultaneously with tomographic reconstruction. In some embodiments, the input dataset is processed and account is taken of both a determined position and a depth of each interaction to accommodate multiplexing effects and produced a modified dataset both before and during tomographic reconstruction.

Thus, in embodiments, the method comprises:
determining an input dataset comprising the determined position and depth of each interaction within the detector;
processing the input dataset to accommodate the effect of multiplexing and produce a modified dataset before subsequent tomographic reconstruction and/or during tomographic reconstruction.

In some embodiments, some or all of the above steps are performed iteratively.

For example, in some embodiments, the processing includes an image reconstruction whereby a multiplexing effect is incorporated in a system matrix used in an iterative reconstruction process. In other embodiments the processing includes a separate iterative de-multiplexing procedure performed in projection space before a final image reconstruction using conventional image reconstruction. In yet further embodiments these principles may be combined and/or used alternately in iterative manner.

As discussed herein, multiplexing consists of overlapping of the projections from different apertures in the detector volume. An optimal de-multiplexing procedure is likely to depend on the amount of multiplexing at different depths in the detector volume.

Possible embodiments of a de-multiplexing procedure include any or all of the following steps:
- dividing the depth of the detector volume into a finite number of different depth of interaction layers (physically or virtually defined);
- estimating virtual two-dimensional multiplex free projections for each depth layer by applying an algorithm during which data are transformed between the two-dimensional and a three-dimensional data format, whereby multiplexing is introduced;
- generating a de-multiplexed projection set by taking account of different degrees of multiplexing in the respective depth of interaction layers.

The de-multiplexed data could be determined at either a selected DO plane in the detector or any desired virtual detector plane.

In some embodiments, the estimating step may comprise estimating virtual two-dimensional multiplex free projections for each depth layer and applying an iterative ML-EM algorithm during which data are transformed by forward and back projection between the two-dimensional and a three-dimensional data format.

In some embodiments, the de-multiplexed projection is used to generate a three-dimensional solution and for example a three-dimensional image dataset.

In all such cases, the invention is in particular distinguished by the use of measured depth of interaction data which can serve to accommodate overlap at the detector and for example overlap across multiple pixels on the detector and to enable a reduction in resultant image artefacts. This is presented as an alternative to the prior art approach which seeks to reduce image artefacts by directly reducing the overlap at the detector. In accordance with the principles of the invention, if the depth of each interaction can be resolved to some degree, a dataset may be produced in which each photon interaction can be localised positionally to some degree in all of the x, y and z co-ordinates, allowing artefacts to be reduced in the produced image without the need for a collimator that is rigidly configured to avoid overlap between the projections from adjacent apertures.

In accordance with the invention in a further aspect, a radiation detection system for the detection of radiation from a source is provided comprising:
- a radiation detector;
- a collimator positionable between the source and the detector in use, wherein the collimator has a plurality of apertures; a
- processing module operable to:
- receive a plurality of responses each being a response to an interaction with incident radiation occurring within the detector;
- determine, for each of the plurality of responses, a characteristic of the interaction, wherein the characteristic comprises at least a position and depth of the interaction within the detector;
- process the said plurality of responses in accordance with the determined position and depth of each interaction by simultaneously processing position and depth of interaction data in such manner as to accommodate the effect of multiplexing due to overlap of the projected radiation pathways from multiple apertures in the collimator at the detector on the detected position on the detector.

In particular preferably, the system is a system adapted to perform the method of the first aspect of the invention.

In embodiments therefore, the processing module is further operable to perform in any appropriate combination one or more of the determining or processing steps of the method of the invention as herein defined.

In embodiments, the detector is itself adapted or configured to enable an interaction with incident radiation occurring within the detector to be localised to at least a position and depth of the interaction within the detector.

The system is in particular a system adapted for the performance of the method of the first aspect, and preferred features of each aspect will be understood to be applicable to the other.

In particular, the processing module of the system may be operable to, and/or the system may further comprise additional modules such as an imaging module operable to, perform any of the steps of the method of the method of the first aspect of the invention.

In example embodiments, the detector has a detector x, y plane and a detector z direction orthogonal thereto; and the processing module is operable to localise each interaction to a position in a detector x, y plane and to a depth of the interaction in a detector z direction. In some embodiments, the detector is adapted or configured to enable an interaction with incident radiation occurring within the detector to be so localised.

In example embodiments, the detector is pixelated into a plurality of separately addressable detector sub-units as above defined; and the processing module is operable to localise each interaction to a particular sub-unit and to a depth of the interaction therein. In some embodiments, the detector is adapted or configured to enable an interaction with incident radiation occurring within the detector to be so localised.

In embodiments, the collimator may have a one-dimensional array or a two-dimensional array of plural apertures. Apertures may be configured, for example with reference to a short length and/or a divergent profile in an emergent radiation direction, to tend to cause radiation passing through the aperture to have a non-zero spread angle as it emerges. A suitable spread angle might be at least 15 degrees.

In some embodiments, the collimator comprises plural slits and for example a slit-slat arrangement. In other embodiments, the collimator comprises a two-dimensional array of pinholes. Other arrangements of plural diverging apertures may be envisaged.

In some embodiments, the detector is adapted or configured to enable an interaction with incident radiation occurring within the detector to be localised to an interaction position within the detector in three dimensions.

In some embodiments for example, the detector is a voxel detector comprising a three-dimensional voxel array. In such a case, determining, for each of the plurality of responses, a characteristic of the interaction including at least a position in three dimensions of the interaction comprises localising the said interaction to a particular voxel.

In some embodiments, the detector comprises a means to localise an interaction within the detector to each of an x and a y direction in a plane generally perpendicular to a direction of incident radiation, and a z direction comprising a depth within the detector in a direction generally orthogonal to the x, y plane.

For example, the detector comprises a detection surface divided into a plurality of separately addressable detection portions defined positionally across the detection surface in each of two orthogonal directions, hereinafter an x-direction and a y-direction, whereby an interaction at the detection module of a particle of a radiation incident from the source may be localised positionally to a detection portion; and a depth in a third orthogonal direction, hereinafter a z-direction, the radiation detector being configured such that an interaction at the detection module of a particle of a radiation incident from the source may be further localised positionally to a depth in the z direction.

Thus, the detector is configured to enable a determination of a depth of interaction (that is, a dimension in a z-direction) at which each photon interaction occurs. This may be achieved in any suitable way by combination of materials, structural features and processing electronics.

For example, a detector may be fabricated from a material that inherently allows depth of interaction information to be extracted, such as a bulk crystal cadmium telluride type solid state semiconductor detector. The materials making up the semiconductor detector are for example selected from cadmium telluride, cadmium zinc telluride (CZT), cadmium manganese telluride (CMT) and alloys thereof, and for example comprise crystalline $Cd_{1-(a+b)}Mn_aZn_bTe$ where $a+b<1$ and a and/orb may be zero.

Bulk single crystal detectors may be particularly preferred.

Additionally or alternatively, the detector may comprise multiple discrete layers in a z-direction of suitable detector materials. For example, multi-layer scintillator detectors may be suitable for implementation of the invention.

In some embodiments, the method further comprises generating an image and optionally further displaying the image. The system may further comprise an image generation module for generating an image and an image display. The method may further comprise generating successive images as a tomographic reconstruction. The system may further comprise a tomographic reconstruction module to effect the same.

In some embodiments, the image is a tomographic image and the image generation module comprises a tomographic image reconstruction module for generating successive images as a tomographic reconstruction, for example utilising the 3D location of detected events to account for uncertainties in the origin of radioactivity. Optionally, this may be done directly within the reconstruction or as a prior processing step. Optionally, hybrid approaches such as the hybrid method explored below may be employed.

In some embodiments, the image is an estimated activity distribution for a selected object plane, suitable for verification of system operation, and the image generation module involves back projection, utilising the 3D location of detected events to account for uncertainties in the origin of radioactivity as a prior processing step.

Other preferred features of the system of the second aspect will be understood by analogy from the discussion of the method of the first aspect and vice versa.

BRIEF DESCRIPTION OF DRAWINGS

The invention will now be described by way of example only with reference to FIGS. 1 to 11 of the accompanying drawings, in which.

DETAILED DESCRIPTION

Figure 1:
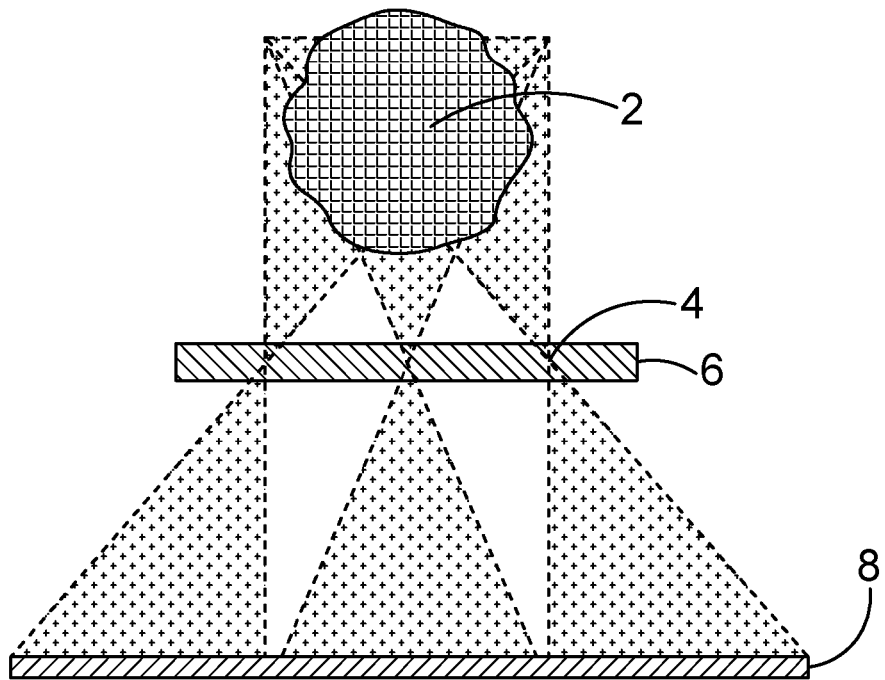
FIG. 1 illustrates an example prior art multiple pinhole system in which detection areas are spaced to avoid multiplexing.

FIG. 1 illustrates an example prior art multiple pinhole system in which detection areas are spaced to avoid multiplexing. A pinhole collimator 6 is shown projecting from an object 2 onto a detector 8 with a large detection areas or pixels defined to be sufficiently spaced to avoid overlap.

Each pinhole 4 in the collimator 6 will create at least a partial image of the object 2 on the detector plane 8. The reconstruction of the full object image from the detector data will be comprised of combining information from all individual images created by each pinhole 4.

The overlapping of the partial images in this sort of arrangement, generally referred to herein as multiplexing, will tend to introduce artefacts into the full object image. Naturally, the bigger the multiplexing regions are, the bigger the resulting reconstructed object image artefact will be. In the example system shown, the spacing of the detection areas or pixels and of the pinholes are selected such that each detection area or pixel corresponding to a pinhole in the collimator is essentially discrete to avoid overlap and the generation of image artefacts on reconstruction of the full object image.

Figure 2:
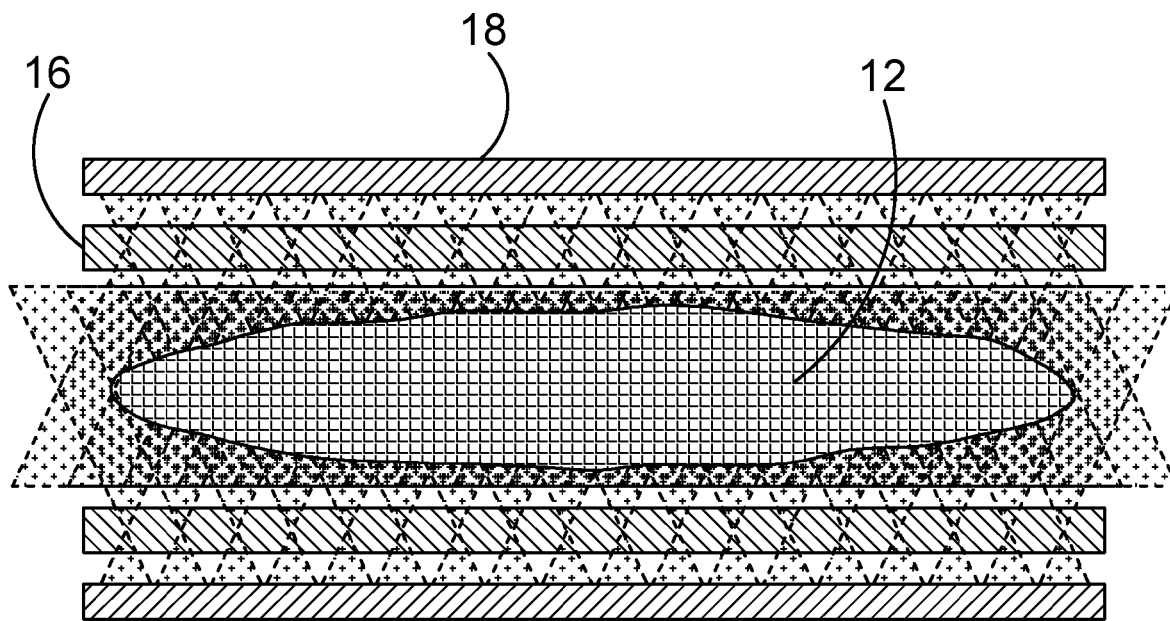
FIG. 2 shows an alternative many-pinhole system with stationary high-resolution detectors and small magnification.

FIG. 2 shows an alternative system comprising a many-pinhole collimator arrangement 16 with stationary high-resolution detectors and small magnification. The collimator 16 projects from an object 12 onto corresponding detector 18. The system would seek to exploit higher-resolution detectors to employ lower magnification while maintaining the expected resolution, which means we could increase the number of pinholes significantly without having to increase the detector surface. The resulting many-pinhole can not only help to improve image quality parameters, it can also lead to the ability of gaining 3D imaging without requiring separate acquisitions from multiple directions.

The standard way of designing multi-pinhole collimation makes sure that there is no overlapping between the projections of the individual pinholes. Increases to pinhole density might be advantageous for other reasons, but will introducing overlapping areas, with consequences that must be dealt with. If the projections of neighbouring pinholes do overlap, they will create regions on the detector that record events originating from two or more pinholes. Since it is impossible to know the actual origins of an event, an extra ambiguity is introduced into the detected signal. Depending on the overall system design, the reconstruction methods to be used, and the nature of the source distribution itself, this uncertainty can lead the serious artefacts on the reconstructed 3D image.

The current invention utilises data obtained for depth of interaction in a detector z direction in addition to data for the interaction in an x, y plane of the detection surface to mitigate this effect and eliminate artefacts. Although this is discussed, for example with reference to FIG. 3, in the context of multi-pinhole collimation, the same principles would apply to other suitable arrays of apertures. There are other collimator configurations which could be used in a same way, for example "slit-slat" or "fan-beam". They could provide the angular sampling similarly to the multi-pinhole collimators thus allow applying the same image reconstruction principles described below.

It is necessary to collect depth of interaction data at the detector. A detector that is inherently able to do this is preferred, and in an embodiment, a thick bulk semiconductor detector of cadmium zinc telluride (CZT) is used. Such a detector intrinsically allows for a depth of a photon interaction in a z direction as well as a location in a particular pixel in x, y to be determined. The invention is not limited to such detectors however. Such a semiconductor detector could be replaced by any "depth sensing" or "3D position sensing" detector structure, including for example scintillator detector modules made of a few layers to provide some depth sensing.

The embodiment utilises the thickness of the semiconductor detector to obtain depth of interaction (DO) data and enable a certain separation between the images from the neighbouring pinholes. The inherent depth resolution of the detector in effect means that we have multiple independent layers of detection. The pinhole projections may overlap in each of the detection layers, but the amount of overlap is different, and different parts of the projections suffer from the overlap. This variation of overlapping in the DOI layers provides additional information for the reconstruction process, and eventually makes the ambiguity from the multiplexing resolvable, which is the key for artefact-free imaging.

Figure 3:
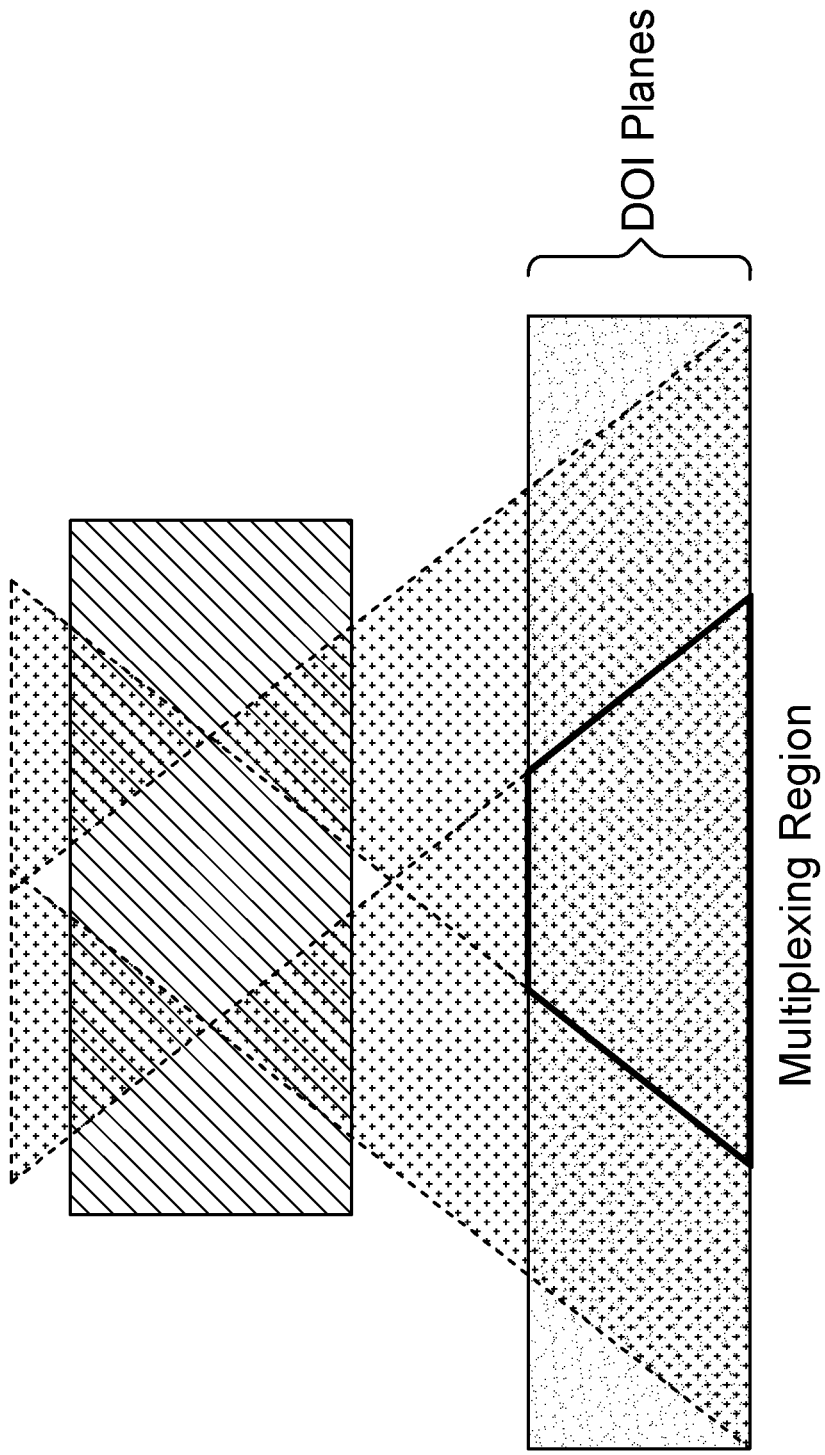
FIG. 3 illustrates the principle of multiplexing of pinhole projections.

FIG. 3 illustrates the principle of multiplexing of pinhole projections. The amount and location of overlap differs in each detection layer. This is exploited by the method of the invention.

In general principle, the invention comprises a multi-apertured collimator that is not configured to avoid overlap between the projections from adjacent apertures, a detector with 3D position of interaction capability, and a reconstruction method. The collimator is configured to project at least two overlapping projections onto the detector, which registers the radiation in multiple depth layers. An artefact-reduced, and ideally an artefact-free, reconstructed image is provided by the reconstruction algorithm using the multi-layered projection data.

The reconstruction algorithm can be a conventional algorithm that is capable of handling the multi-layered data.

Figure 4:
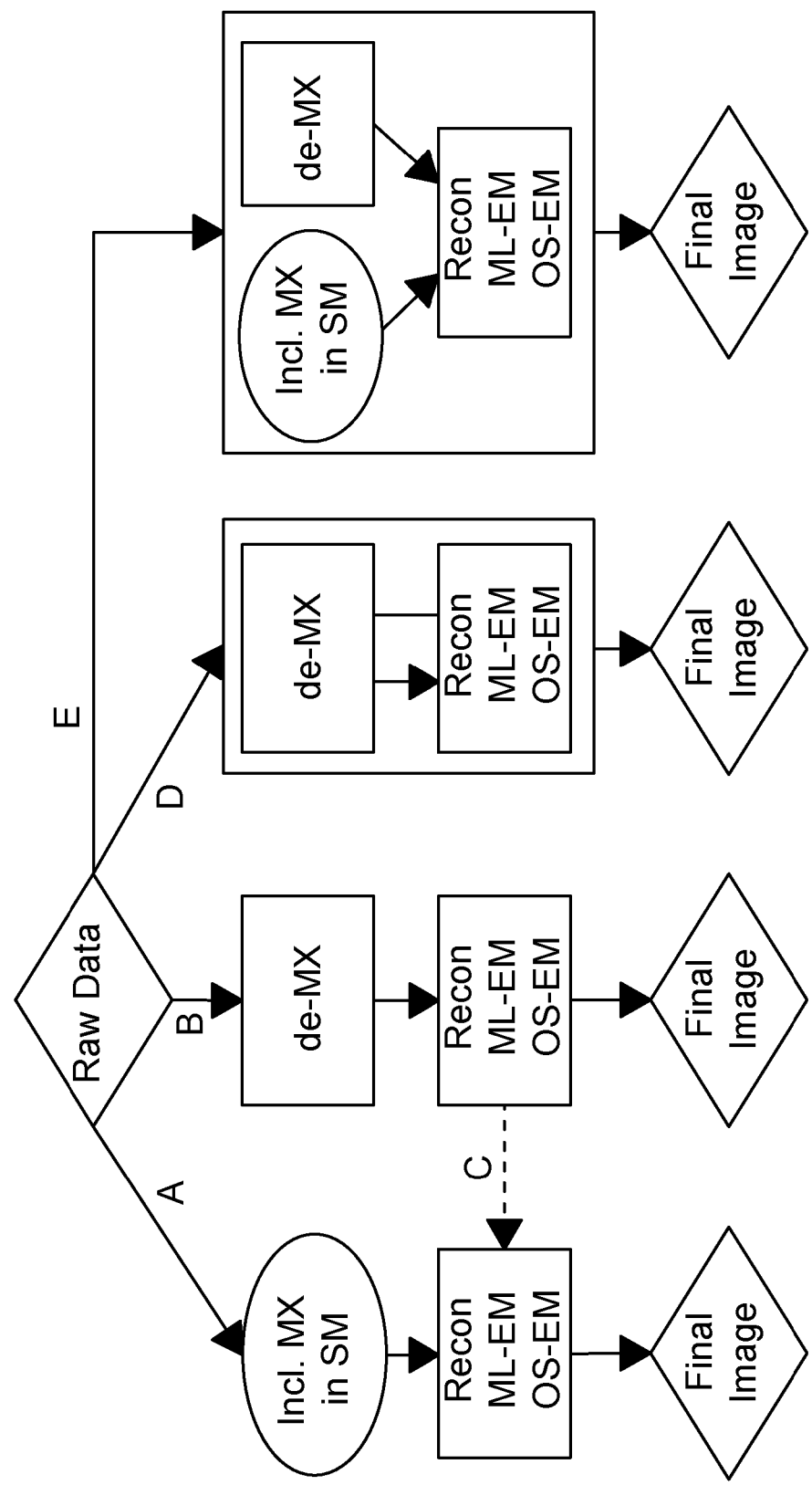
FIG. 4 is a schematic flowchart describing example methods of tomographic reconstruction of multiplexed data in accordance with the principles of the invention.

Alternatively, the reconstruction algorithm may incorporate novel de-multiplexing method steps, such as exemplified by the embodiment below and with reference to FIG. 4, which is a schematic flowchart describing example methods of tomographic reconstruction of multiplexed data in accordance with the principles of the invention.

Tomographic reconstruction of multiplexed data can follow different paths, which include iterative reconstruction by ML-EM or OS-EM or more recent algorithms incorporating regularisation.

Direct reconstruction where the multiplexing (MX) effect is incorporated in the system matrix (SM) used in the iterative reconstruction process. (Option A) A separate iterative de-multiplexing procedure is performed in projection space before the final image reconstruction using conventional image reconstruction. (Option B) Option A and B can be combined by the initialization of the direct reconstruction with the output from the reconstruction with de-multiplexed data. (Option C) Alternating schemes between de-multiplexing and reconstruction where previous images are used as either initialisation of the next step or as regularisation. (Option 0)

Hybrid method: reconstruction that involves an update using both the de-multiplexed and multiplexed projections in combination with options A and B above (Option E).

The optimal algorithm (in terms of image quality for a given computational cost) will depend on the amount of multiplexing in the different layers; Choosing the algorithm and its parameters can be done based on simulated data.

Figure 5:
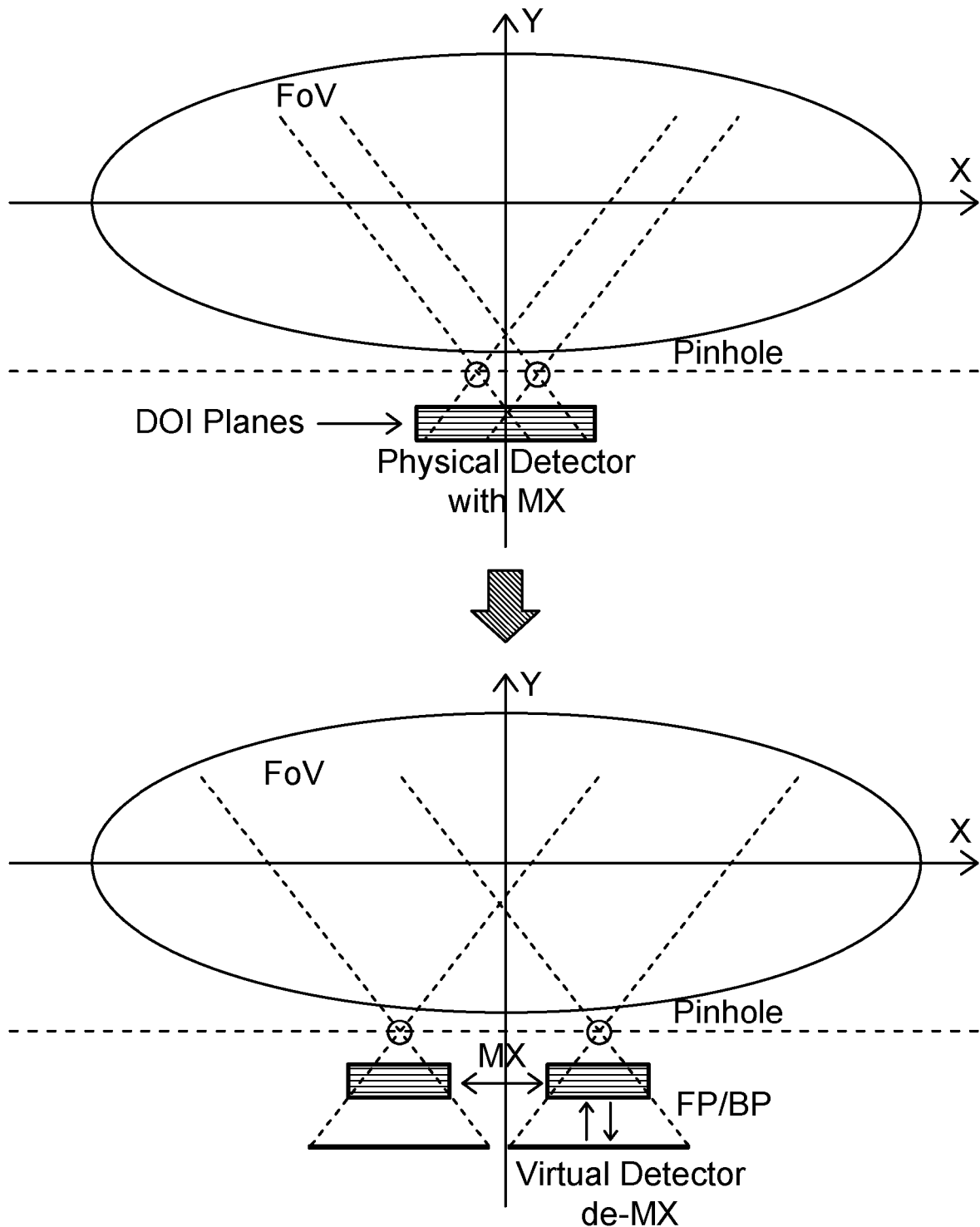
FIG. 5 is a schematic illustration of the method of FIG. 4 as applied to a detector with depth of information resolution.

In an example method embodying the principles of the invention, multiplexing (MX) consists of overlapping of the projections from different pinholes in the detector volume (upper half of FIG. 5).

During the de-MX procedure, the projection data from different pinholes are treated separately (lower half of FIG. 5).

Virtual, MX-free 2D projections are estimated with an iterative ML-EM algorithm, during which data are transformed by forward and back-projection (FP/BP) between the 2D and the 3D data formats, and MX is introduced.

The different MX-degrees in the different DOI layers are automatically taken into account, leading to a stable solution.

The multiplexing operations FP/BP can be implemented by summing of counts in the overlapping/multiplexed regions and are very fast. In a more sophisticated implementation, FP/BP can also take the resolution properties of each detector layer and/or pinhole penetration effects into account.

This is presented as an example only. The key to the invention is the use of a detector, as shown in FIG. 5, with either inherent or constructed DOI layers. If the depth of each photon interaction, that is, the position in a z-direction within a deep detector, can also be resolved to some degree, a dataset may be produced in which each photon interaction can be localised positionally to some degree in all of the x, y and z co-ordinates, allowing artefacts to be reduced in the produced image without the need for a collimator that is rigidly configured to avoid overlap between the projections from adjacent apertures.

A possible advantage is that an effective set of data may be collected at the detector with a much lower inherent source level of radioactivity, and for example in the case of medical imaging a consequent lower radiation dose to the patient's tissue.

Specific example algorithms follow.

De-Multiplexing

The acquired multiplexed 3D projection data can be de-multiplexed with an algorithm that involves the use of a 2D virtual data plane at some selected position with respect to the physical detector. The de-multiplexing algorithm can be described by the following steps, which are repeated for a number of iterations:

$$V_{i,j}^k = A_{i,j} \cdot P_{i,j}^k; i = 1 \ldots N_d; j = 1 \ldots N_p$$

$$V_i^k = \left[V_{i,1}^k V_{i,2}^k \ldots V_{i,N_p}^k\right]^T; i = 1 \ldots N_d$$

$$C_i^k = \left[C_{i,1}^k, C_{i,2}^k, \ldots C_{i,N_p}^k\right]^T = B^T \frac{Q_i}{B \cdot V_i^k}; i = 1 \ldots N_d$$

$$P_{i,j}^{k+1} = \frac{P_{i,j}^k}{A_{i,j}^T \cdot 1} A_{i,j}^T \cdot C_{i,j}^k; i = 1 \ldots N_d; j = 1 \ldots N_p$$

where PL and $vf_1$ are the 2D virtual data plane and 3D detector data, respectively, for detector i and pinhole j after k iterations, Nd and NP are the number of 2D planes and the number of pinholes per detector, respectively, Ai,i is a matrix for transformation from the 2D to the 3D data representation, Bis a matrix representing the multiplexing operator, and Qi is the measured data for detector i. The matrices A and B are determined by the pinhole and detector geometry.

Image Merger

From the de-multiplexed projection data, a simple image of the activity distribution can be produced by a weighted summation process:

$$I(x) = \frac{1}{\sum_{i=1}^{N_d}\sum_{j=1}^{N_p} U(f_i \cdot (x-x_j))} \sum_{i=1}^{N_d}\sum_{j=1}^{N_p} P_{i,j}(f_i \cdot (x-x_j))$$

where x is a 2D position coordinate in the image, $x_1$ is the position of pinhole j, fi. is a magnification factor for detector i, which depends on the chosen imaging plane, and $U(\bullet)$ is a uniform distribution used for normalisation.

This type of image can be used to obtain a quick initial overview of the activity distribution in the object, and also for quality assurance purposes.

Image Reconstruction

Various approaches can be used to obtain the final image based on either the multiplexed or the de-multiplexed (either 2D or 3D) data using the ML-EM [Shepp & Vardi 1982]: where Hi,J is the system matrix for detector i pinhole j. It is also possible to use the $$J^{k+1} = \frac{J^k}{\sum_{i=1}^{N_d}\sum_{j=1}^{N_p} H_{i,j}^T \cdot 1} \sum_{j=1}^{N_p}\sum_{i=1}^{N_d} H_{i,j}^T \frac{P_{i,j}}{H_{i,j} \cdot J^k}$$

OS-EM algorithm [Hudson & Larkin 1994], or other image reconstruction algorithms known to those skilled in the art. The projection data P can be replaced by V, in which case a modified system matrix His required. The algorithm can be implemented with both detector sub-sets and pinhole sub-sets, for acceleration purposes. The use of pinhole sub-sets is possible as the de-multiplexed projection data for different pinholes are independent.

Alternatively an image can be reconstructed directly from the multiplexed projection data, again using MLEM as an example:

$$J^{k+1} = \frac{J^k}{\sum_{i=1}^{N_d} H_i^T \cdot 1} \sum_{j=1}^{N_d} H_i^T \frac{Q_i}{H_i \cdot J^k}$$

where Hi is the system matrix for detector i, including all pinholes with multiplexing. The system matrices Hi (or the multiplications with the system matrices) can in some embodiments be computed in a staged process using the system matrices Hi,J and multiplexing, i.e. Hi=B[$Ai_1 Hi_1$, $Ai_2 Hi_2$, . . . , $Ai_{N_p} Hi_{N_p[T]}$. This algorithm can be implemented with detector subsets. However, the use of pinhole sub-sets is not possible as data corresponding to different pinholes are inter-dependent due to the multiplexing effect.

It is also possible to alternate between these various processing steps. An example embodiment, would alternate between a few iterations of de-multiplexing, a few iterations of reconstruction of the de-multiplexed data, a few iterations of reconstruction of the un-multiplexed data. In these steps, it could be advantageous to include information from the other steps. A particular example would be where the de-multiplexed step includes a penalty that de-multiplexed data has to be close to un-multiplexed projections of a previously obtained image estimate. Another example would be where there is no alternation but the above steps are performed in sequence, using the reconstruction of the de-multiplexed data as an initialisation for the final reconstruction. A final option is to combine the de-multiplexing of projections with the direct use in the system matrix, combining these within the update in the reconstruction algorithm. The update therefore is based on both the ratio of non-multiplexed estimated projections with the de-multiplexed raw data, and the ratio of the estimated multiplexed projections with the raw data.

Detailed Discussion of Example Approaches

The following provides discussion of example novel approaches to reconstruction of highly multiplexed data for use in stationary low-dose molecular breast tomosynthesis according to the principles of the invention. These are intended to address issues around multiplexing (MX), which leads to ambiguity regarding the direction of incidence of the detected y-photons. We have developed various novel approaches to address this problem by performing de-MX either before or during the image reconstruction, aided by the DOI information. We have shown that, by optimising the system geometry, it is possible to gain a factor of 2 in effective sensitivity as compared to a system without MX.

Applicant is developing a stationary tomosynthesis system for MBI, based on CZT detectors with DOI and MPH collimation. Our basic idea is to use a large number of pinholes, allowing for MX, resulting in higher sensitivity and improved sampling. With MX, there is some degree of ambiguity regarding the direction of incidence of the detected y-photons, which can lead to artefacts in the reconstructed images. However, it has been shown in the past that artifact-free images can be obtained by combining multiplexed and non-multiplexed data. DOI information has the potential to provide data with variable amounts of MX, which could therefore aid in de-multiplexing.

We have investigated various design configurations in a multi-parameter space in order to optimize the system performance. We have also developed a novel de-MX approach that can be applied to the projection data before reconstruction. Here we compare this approach with direct reconstruction that incorporates MX in the system matrix as well as a hybrid approach.

Materials and Methods

Data Generation

Figure 6:
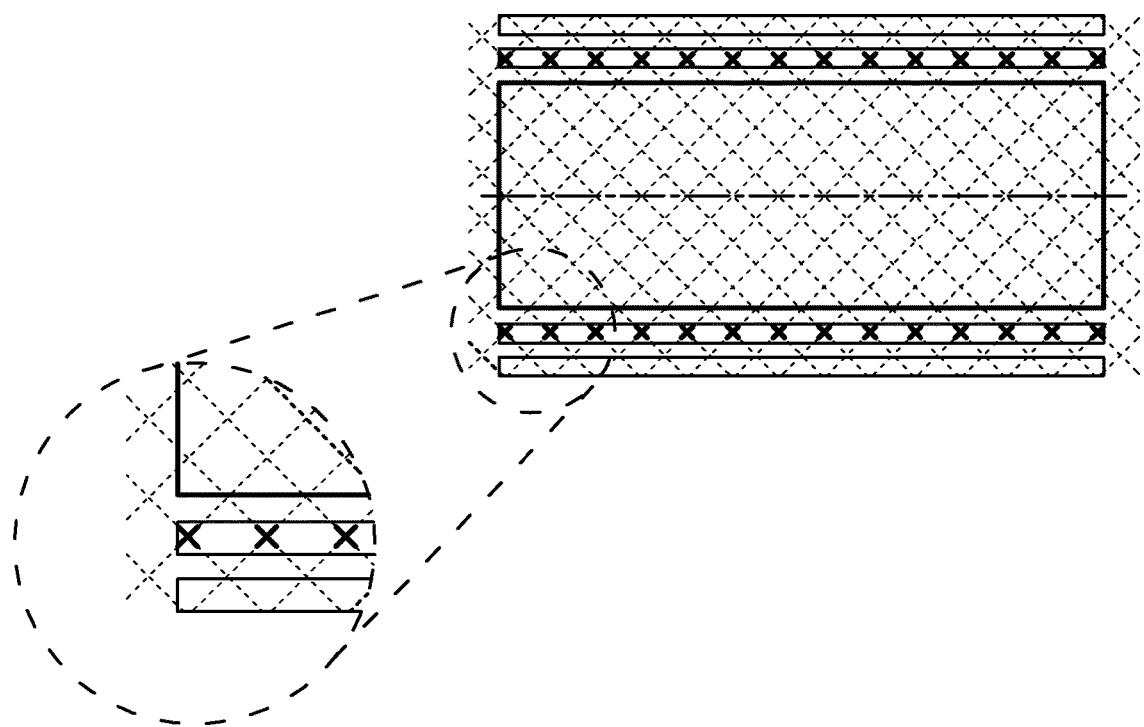
FIGS. 6 to 11 illustrate aspects of a specific example implementation.

An example system consists of two planar CZT detector arrays placed opposite each other (FIG. 6, showing full system geometry (left), and a blow-up of the corner region, showing multiplexing (right)). We assume the use of mild breast compression for a mean thickness of 6 cm. We performed simulations for a 16×16 cm detector size with a pixel-size of 1×1 mm and DOI estimation in 1-mm layers. For the system optimisation, we investigated the following parameters: Number of pinholes, pinhole aperture size, pinhole opening angle and collimator-to-detector distance.

We first used analytical calculations of contrast-to-noise ratio (CNR) to narrow down the parameter space. Next we performed analytical simulations generating projection data corresponding to a phantom containing one layer of spherical lesions in four quadrants of 36 spheres each. The sphere diameter was 6 mm and the sphere-to-background ratios were 5, 10, 15 and 20 in the four quadrants, respectively. Simulations were also performed with four layers of spheres separated by 15 mm. The simulations represented 10-min patient scans after injection of 150 MBq of $^{99m}$Tc-MIBI. We estimated that this would result in a background activity concentration of 760 Bq/ml.

De-Multiplexing and Reconstruction

Figure 7:
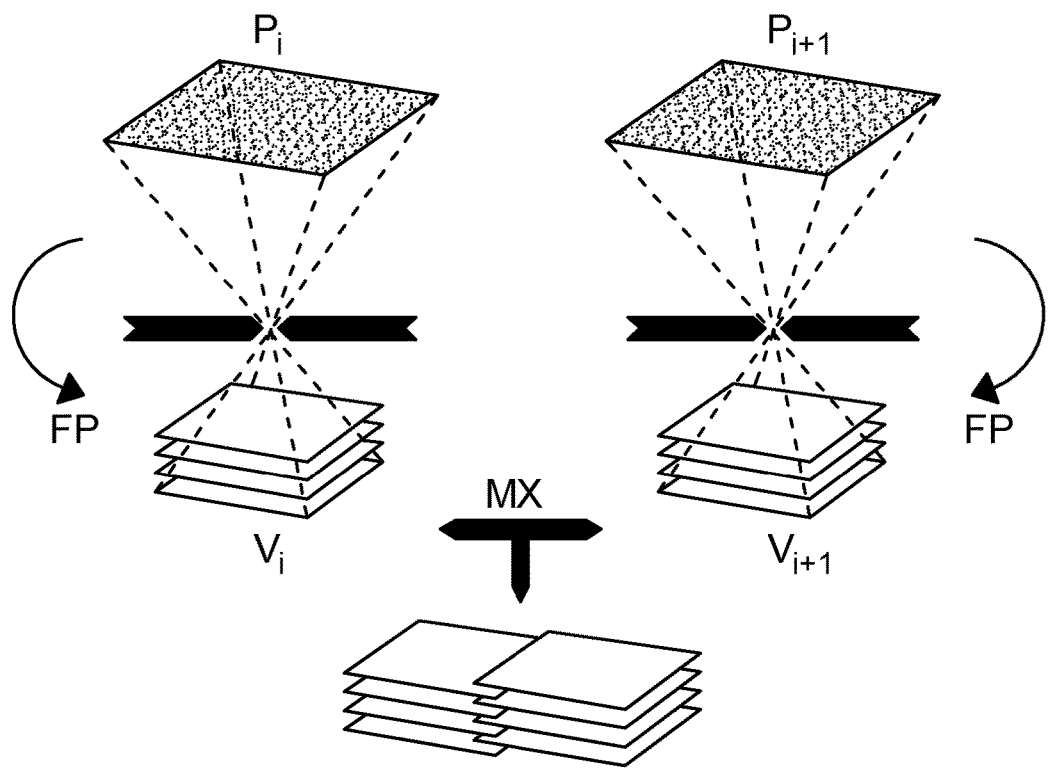

The algorithm consists of an iterative procedure where data are forward and back-projected between virtual 2D planes, representing each pinhole, and 3D detector blocks (FIG. 7, which is an illustration of the forward transformation process in the de-multiplexing algorithm. Virtual planes are projected (FP) onto multi-layered detector blocks, which are then merged with multiplexing (MX)).

This de-MX method differs from prior art examples in that it is entirely independent of the tomographic reconstruction process.

Figure 8:
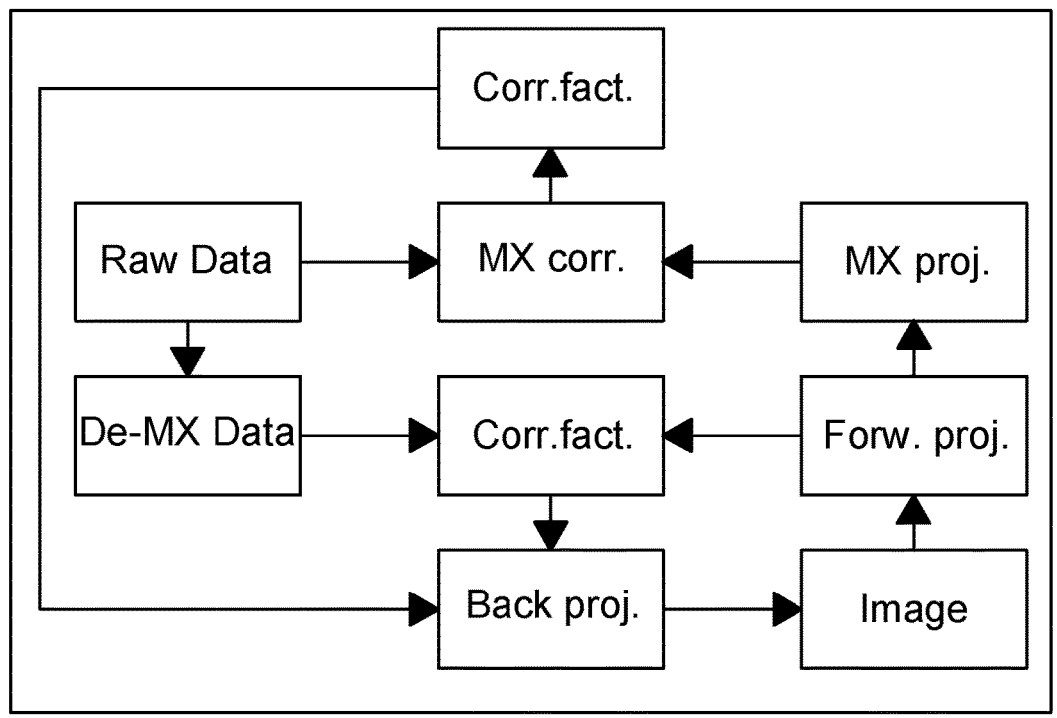

For the tomographic reconstruction, we have implemented three different approaches: 1) 1-step: direct image reconstruction, incorporating MX in the system matrix [Option A]; 2) 2-step: de-MX is applied to the projection data before tomographic reconstruction [Option B]; and 3) a combination of the two methods, in which, at each iteration, the image is updated using the average of the correction factors obtained from the MX data and the de-MX data [Option E](FIG. 8 shows a schematic description of hybrid reconstruction algorithm. The correction factors are calculated based on both MX and de-MX data). For the reconstruction we used a MAP algorithm with a prior obtained by distance dependent smoothing for resolution equalisation.

Here we compare the three approaches in terms of contrast and noise. We also compare the results with images reconstructed from ideal projection data for the same geometry but without MX (which is not possible in practice).

Results

Figure 9:
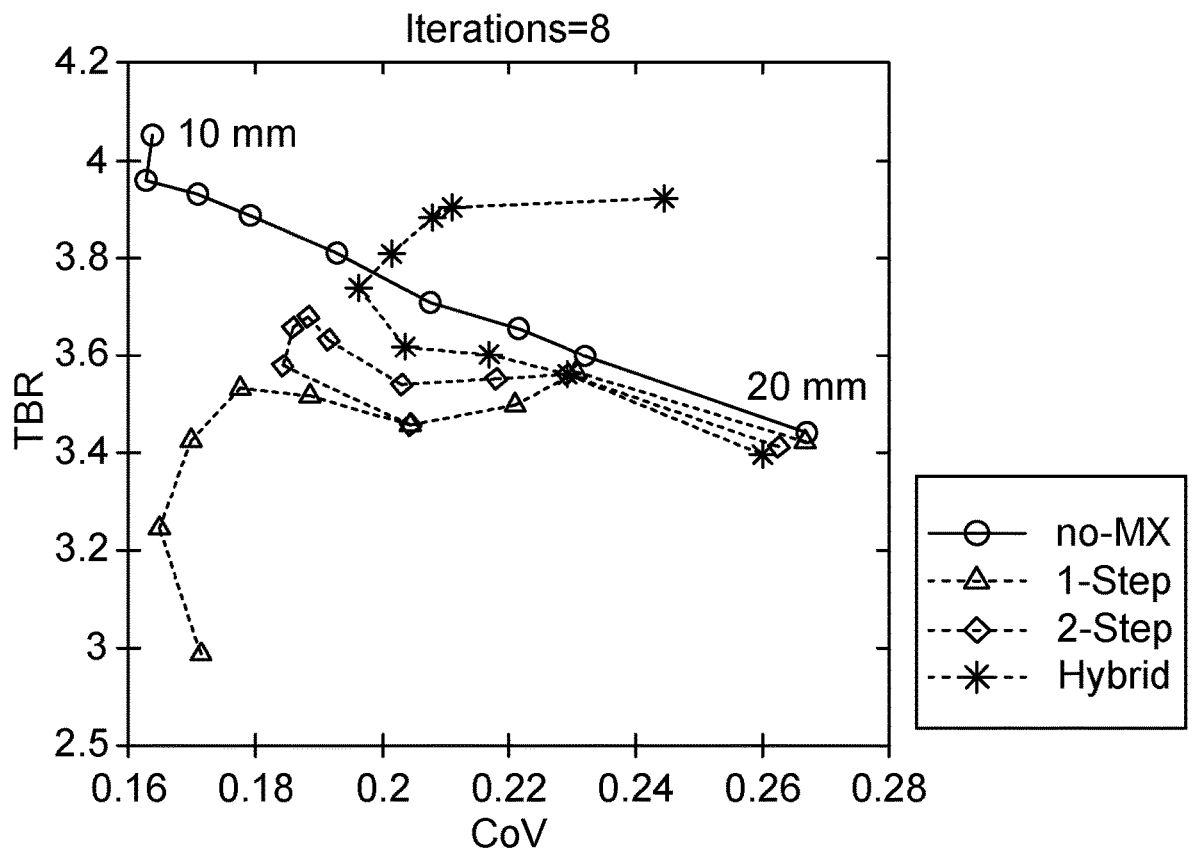

Target-to-background ratios (TBR) were calculated for the spheres in the single layer phantom and the coefficient-of-variation was calculated in the uniform region away from the sphere-plane. FIG. 9 shows TBR vs. CoV curves with different MPH configurations from 8×8 to 16×16 pinholes per head with separations of 10-16, 18 and 20 mm. The solid line with circles represents the ideal (but unachievable) no-MX case, while the dashed lines with circles represents different reconstruction approaches for the MX data. Dotted lines join points with the same pinhole separation. The 8×8 configuration with 20 mm separation corresponds to the actual MX-free case. The graph resembles a "bow and arrow", with the "arrow" corresponding to the ideal no-MX situation, and the other three curves corresponding to the different reconstruction approaches. Starting from the MX-free case on the right side of the graph, all three curves initially move more or less in the same direction as the ideal curve. They then seem to hit an invisible barrier and bounce off in different directions, due to unresolved MX or noise-amplification. Along the "invisible barrier" there are multiple solutions, which are essentially equivalent, but have different bias vs. noise trade-offs. The "bow" crosses the "arrow" at a point corresponding to ~14.3 mm pinhole separation. Compared to the MX-free case, this corresponds to a pinhole density increase by a factor of $(20/14.3)^2 \approx 2$, which represents the effective increase in sensitivity.

Figure 10:
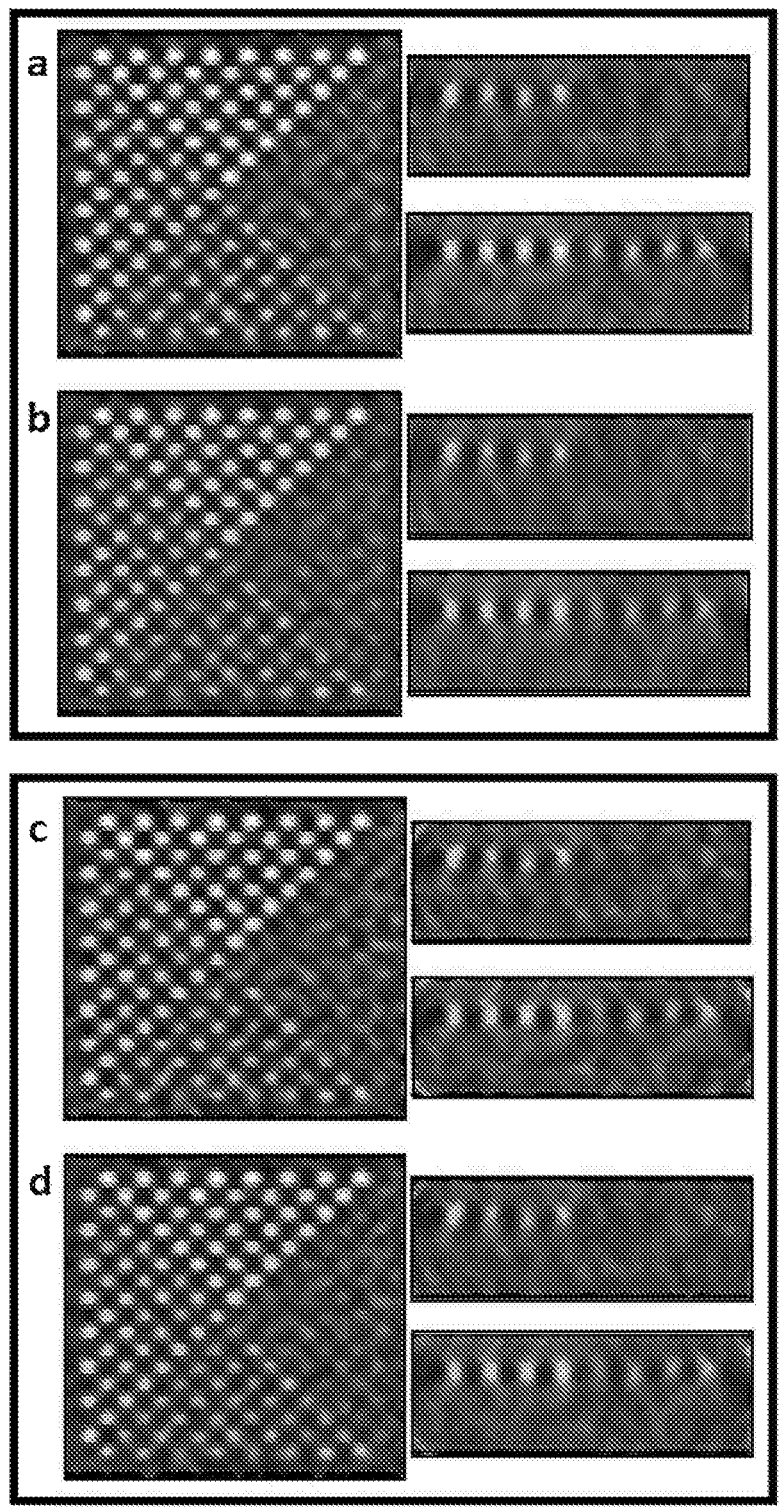

The MPH configuration with 14×14 pinholes with 12 mm separation was chosen for further evaluation. Reconstructed images are shown in FIG. 10 for the different reconstruction approaches. Reconstructed images (trans-axial, coronal and sagittal) are shown for a 14×14 pinhole configuration (12 mm separation) with different reconstruction approaches: a) ideal case without MX, b) 1-step, c) 2-step, and d) hybrid reconstruction.

Figure 11:
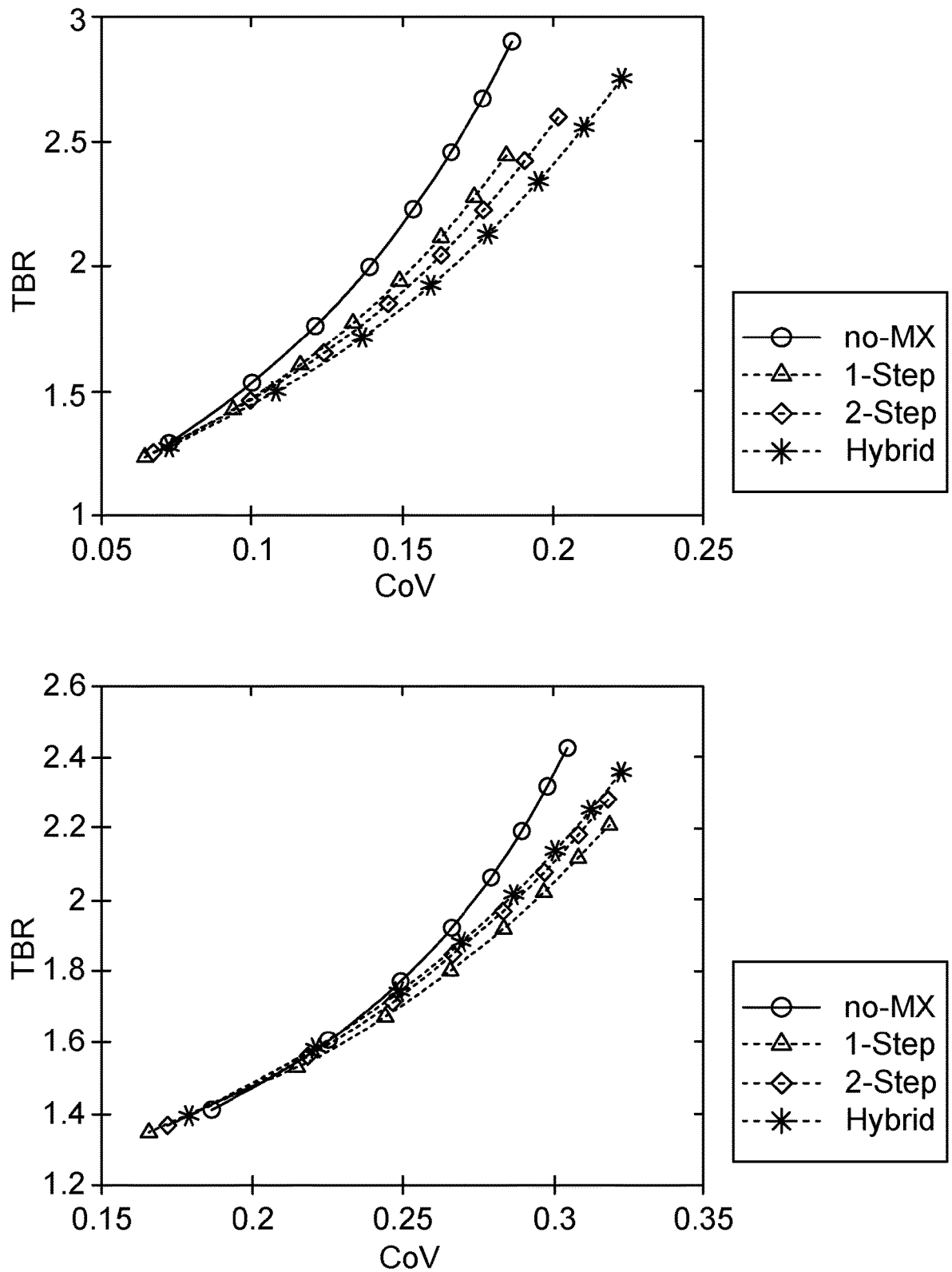

FIG. 11 shows TBR vs. CoV curves for the different reconstruction approaches in the single layer phantom and in the multi-layer phantom. BR vs. CoV curves with different number of iterations (1-8) are shown for different reconstruction approaches in a single layer (top) and a multi-layer phantom (bottom). The no-MX curve is always best, as it represents an ideal case without MX which is not possible in practice. It can be seen that the best approach (apart from the ideal no-MX case) is different for the two phantoms; the 1-step for the single layer phantom, and the 2-step for the multi-layer phantom. In both cases, the results of the hybrid method are between the other two, representing a good compromise.

The invention claimed is:

1. A method of processing radiation from a source comprising:
    positioning a detector to receive radiation from the source, wherein the radiation detector is a semiconductor detector comprising crystalline $Cd_{1-(a+b)}Mn_aZn_bTe$ where $a+b<1$, and a and b may be zero;
    positioning a collimator between the source and the detector, wherein the collimator has a plurality of apertures;
    allowing radiation from the source to pass through the collimator and be incident upon the detector;
    receiving a plurality of responses each being a response to an interaction with incident radiation occurring within the detector;
    determining, for each of the plurality of responses, a characteristic of the interaction, wherein the characteristic comprises at least a position and depth of the interaction within the detector; and
    processing the said plurality of responses by simultaneously processing position and depth of interaction data in such manner as to accommodate the effect of multiplexing due to overlap of the projected radiation pathways from multiple apertures in the collimator at the detector on the detected position on the detector.

2. The method of claim 1, comprising:
    determining an input dataset comprising the determined position and depth of each interaction within the detector, and
    processing the input dataset and producing therefrom a modified dataset comprising at least data comprising a position of each interaction modified in such manner as to accommodate the effect of multiplexing due to overlap of the projected radiation pathways from the multiple apertures.

3. The method of claim 1, comprising:
    processing the data for the successive plurality of particle interactions to generate an image dataset, wherein the image dataset is generated by a tomographic reconstruction and the method comprises processing position and depth of interaction data in such manner as to accommodate the effect of multiplexing on the reconstructed tomographic image dataset to reduce multiplexing artefacts in the reconstructed tomographic image.

4. The method of claim 3, wherein the processing to accommodate the effect of multiplexing on the reconstructed tomographic image dataset is performed by a de-multiplexing procedure include any or all of the following steps:

dividing the depth of the detector volume into a finite number of different depth of interaction layers;

estimating virtual two-dimensional multiplex free projections for each depth layer and applying an algorithm during which data are transformed between the two-dimensional and a three-dimensional data format, whereby multiplexing is introduced;

generating a de-multiplexed projection set by taking account of different degrees of multiplexing in the respective depth of interaction layers.

5. The method of claim 4, wherein the estimating comprises estimating virtual two-dimensional multiplex free projections for each depth layer and applying an iterative ML-EM algorithm during which data are transformed by forward and back projection between the two-dimensional and a three-dimensional data format.

6. The method of claim 1, comprising:

determining an input dataset comprising the determined position and depth of each interaction within the detector;

processing the input dataset to accommodate the effect of multiplexing and produce a modified dataset before subsequent tomographic reconstruction.

7. The method of claim 6, comprising:

determining an input dataset comprising the determined position and depth of each interaction within the detector;

processing the input dataset to accommodate the effect of multiplexing and produce a modified dataset as part of the tomographic reconstruction.

8. The method of claim 1, wherein:

the detector has a detector x, y plane and a detector z direction orthogonal thereto;

the method comprises localising each interaction to a position in a detector x, y plane and to a depth of the interaction in a detector z direction.

9. The method of claim 1, wherein:

the detector is pixelated into a plurality of separately addressable detector sub-units;

the method comprises localising each interaction to a particular sub-unit and to a depth of the interaction therein.

10. The method of claim 6, wherein the collimator comprises one or more of:

an array of pinholes, and for example a two-dimensional array of pinholes;

an array of slits and for example an array of slits in a slit-slat arrangement.

11. The method of claim 6, comprising the use of a detector adapted or configured to enable an interaction with incident radiation occurring within the detector to be localised to an interaction position within the detector in three dimensions.

12. The method of claim 6, comprising the use of a detector comprising a three-dimensional voxel array, wherein the determining for each of the plurality of responses, a characteristic of the interaction including at least a position in three dimensions of the interaction comprises localising the said interaction to a particular voxel.

13. A radiation detection system for the detection of radiation from a source comprising:

a radiation detector, wherein the radiation detector is a semiconductor detector comprising crystalline $Cd_{1-(a+b)}Mn_aZn_bTe$ where $a+b<1$, and a and b may be zero;

a collimator positionable between the source and the detector in use, wherein the collimator has a plurality of apertures;

a processing module operable to:

receive a plurality of responses each being a response to an interaction with incident radiation occurring within the detector;

determine, for each of the plurality of responses, a characteristic of the interaction, wherein the characteristic comprises at least a position and depth of the interaction within the detector;

process the said plurality of responses in accordance with the determined position and depth of each interaction by simultaneously processing position and depth of interaction data in such manner as to accommodate the effect of multiplexing due to overlap of the projected radiation pathways from multiple apertures in the collimator at the detector on the detected position on the detector.

14. The system of claim 13, wherein the detector is adapted and configured to enable an interaction with incident radiation occurring within the detector to be localised to at least a position and depth of the interaction within the detector.

15. The system of claim 13, wherein:

the detector has a detector x, y plane and a detector z direction orthogonal thereto;

the processing module is operable to localise each interaction to a position in a detector x, y plane and to a depth of the interaction in a detector z direction.

16. The system of claim 13, wherein:

the detector is pixelated into a plurality of separately addressable detector sub-units;

the processing module is operable to localise each interaction to a particular sub-unit and to a depth of the interaction therein.

17. The system of claim 13, wherein the wherein the collimator comprises one or more of:

an array of pinholes and for example a two-dimensional array of pinholes;

an array of slits and for example an array of slits in a slit-slat arrangement.

18. The system of claim 13, wherein the semiconductor detector comprises a semiconductor detector material selected from cadmium telluride, cadmium zinc telluride (CZT), cadmium manganese telluride (CMT) and alloys thereof.

19. The system of claim 13 further comprising an image generation module for generating an image, wherein the image is a tomographic image and the image generation module comprises a tomographic image reconstruction module for generating successive images as a tomographic reconstruction utilising the 3D location of detected events to account for uncertainties in the origin of radioactivity.

20. The system of claim 19, wherein the image is an estimated activity distribution for a selected object plane, suitable for verification of system operation, and the image generation module involves back projection, utilising the 3D location of detected events to account for uncertainties in the origin of radioactivity as a prior processing step.

* * * * *